United States Patent
Ramirez Llanos

(10) Patent No.: US 11,175,677 B2
(45) Date of Patent: Nov. 16, 2021

(54) TOW VEHICLE AND TRAILER ALIGNMENT

(71) Applicant: Continental Automotive Systems, Inc., Auburn Hills, MI (US)

(72) Inventor: Eduardo Jose Ramirez Llanos, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 378 days.

(21) Appl. No.: 16/401,069

(22) Filed: May 1, 2019

(65) Prior Publication Data
US 2019/0339708 A1    Nov. 7, 2019

Related U.S. Application Data

(60) Provisional application No. 62/665,308, filed on May 1, 2018.

(51) Int. Cl.
*G06T 7/73* (2017.01)
*B60R 1/00* (2006.01)
(Continued)

(52) U.S. Cl.
CPC .......... *G05D 1/0251* (2013.01); *B60R 1/003* (2013.01); *B60W 30/18036* (2013.01);
(Continued)

(58) Field of Classification Search
CPC .. B60D 1/06; B60D 1/065; B60D 1/36; B60R 2300/808; G05D 1/0251;
(Continued)

(56) References Cited

U.S. PATENT DOCUMENTS

| 2002/0154005 A1 | 10/2002 | Wall et al. | |
| 2013/0226390 A1* | 8/2013 | Luo | B60D 1/36 701/25 |

(Continued)

FOREIGN PATENT DOCUMENTS

| CN | 106225723 A | 12/2016 |
| EP | 2682329 A1 | 1/2014 |

(Continued)

OTHER PUBLICATIONS

Atoum et al. "Monocular Video-Based Trailer Coupler Detection Using Multiplexer Convolutional Neural Network" 2017 IEEE, 9 pages.*

(Continued)

*Primary Examiner* — Nathnael Aynalem

(57) ABSTRACT

A method of aligning a tow vehicle with a trailer positioned behind the tow vehicle is provided. The method includes determining a point cloud map of a rear environment of the tow vehicle. The rear environment includes the trailer. The method also includes determining a front face plane of the trailer based on the point cloud map. The method also includes determining a normal line of the front face plane. The method also includes determining a path from the tow vehicle to the trailer such that a fore-aft axis of the tow vehicle is aligned with the normal line of the front face plane.

14 Claims, 11 Drawing Sheets

(51) Int. Cl.
*B60W 30/18* (2012.01)
*G05D 1/02* (2020.01)
*B60W 50/00* (2006.01)

(52) U.S. Cl.
CPC .......... *G06T 7/74* (2017.01); *B60R 2300/301* (2013.01); *B60R 2300/304* (2013.01); *B60R 2300/808* (2013.01); *B60R 2300/8026* (2013.01); *B60W 2050/0005* (2013.01)

(58) Field of Classification Search
CPC . G06T 2207/10028; G06T 2207/20104; G06T 2219/2004; G06T 7/73; G06T 7/74; G06T 7/75; G06T 7/70; G06T 19/20; G01C 11/28; G06K 9/3233; B62D 13/06
USPC ........................................................ 348/148

See application file for complete search history.

(56) References Cited

U.S. PATENT DOCUMENTS

| | | |
|---|---|---|
| 2014/0151979 A1 | 6/2014 | Puckett |
| 2015/0321666 A1 | 11/2015 | Zhang |
| 2016/0052548 A1 | 2/2016 | Singh et al. |
| 2018/0039278 A1 | 2/2018 | Huger et al. |
| 2018/0056868 A1 | 3/2018 | Naserian et al. |
| 2018/0365509 A1* | 12/2018 | Naserian .............. G06K 9/3233 |

FOREIGN PATENT DOCUMENTS

| | | | |
|---|---|---|---|
| EP | 3171334 A1 | 5/2017 | |
| EP | 3299191 A1 | 3/2018 | |
| WO | WO-2019202317 A1 * | 10/2019 | ............... G06T 7/73 |

OTHER PUBLICATIONS

International Search Report and the Written Opinion of the International Searching Authority dated Jul. 5, 2019 for corresponding PCT application No. PCT/US2019/030285.
Christopher Charles De Saxe, "Vision-based trailer pose estimation for articulated vehicles", Sep. 2017, Jesus College, XP055517775.

* cited by examiner

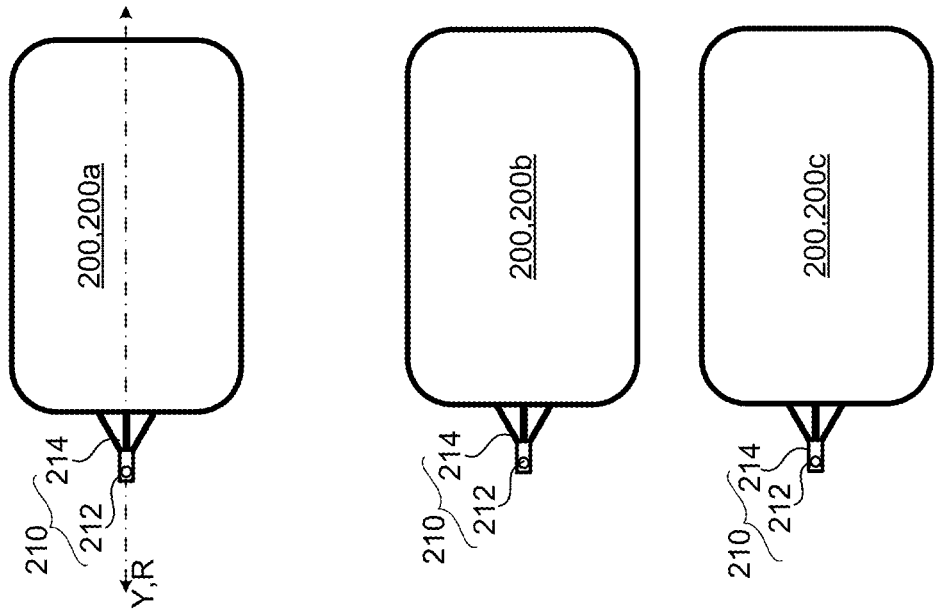
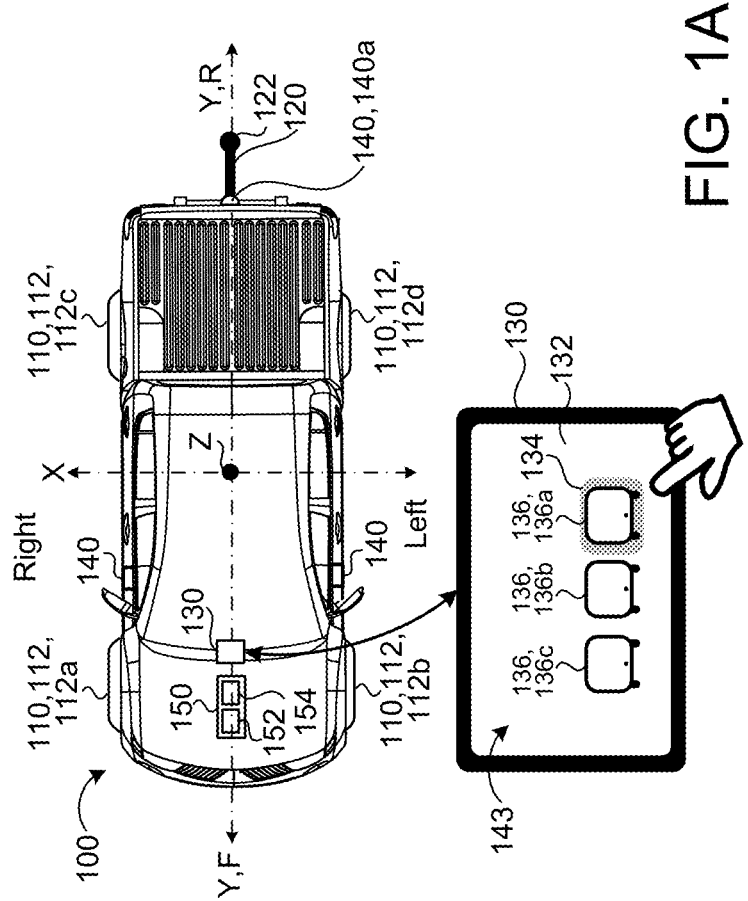
FIG. 1A

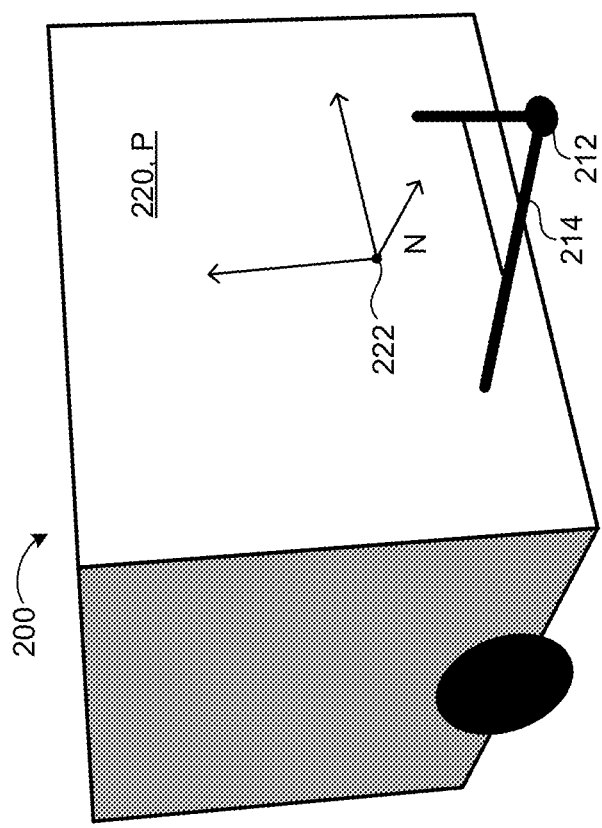

TOW VEHICLE AND TRAILER ALIGNMENT

CROSS REFERENCE TO RELATED APPLICATIONS

This U.S. patent application claims priority under 35 U.S.C. § 119(e) to U.S. Provisional Application 62/665,308, filed on May 1, 2018, which is hereby incorporated by reference in its entirety.

TECHNICAL FIELD

This disclosure relates to a method and device for aligning a tow vehicle with a trailer.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Recent advancements in sensor technology have led to improved safety systems for vehicle, for example, vehicle-trailer connection process. As such, it is desirable to provide a system that is capable of aligning the tow vehicle with the trailer during the hitching process.

SUMMARY

One aspect of the disclosure provides a method of aligning a tow vehicle with a trailer positioned behind the tow vehicle. The method includes determining, by data processing hardware, a point cloud map of a rear environment of the tow vehicle. The rear environment includes the trailer. The method also includes determining, by the data processing hardware, a front face plane of the trailer based on the point cloud map; and determining, by the data processing hardware, a normal line of the front face plane. The method also includes determining, by the data processing hardware, a path from the tow vehicle to the trailer such that a fore-aft axis of the tow vehicle is aligned with the normal line of the front face plane.

Implementations of the disclosure may include one or more of the following optional features. In some implementations, the method includes sending instructions to a drive system in communication with the data processing hardware. The instructions causing the tow vehicle to autonomously drive along the path in a rearward direction.

In some examples, the method further includes receiving one or more images from a camera positioned on a back portion of the tow vehicle and in communication with the data processing hardware. The method may also include identifying a region of interest (ROI) that includes a trailer representation within the one or more images. The trailer representation indicative of the trailer positioned behind the tow vehicle. In some examples, determining the point cloud map of the rear environment of the tow vehicle includes determining the point cloud map associated with the ROI only.

The method may further include: receiving images from a camera positioned on a back portion of the tow vehicle and in communication with the data processing hardware. The method may also include determining at least three three-dimensional positions of the rear camera from the received images, while the tow vehicle is moving. The method may also include determining a camera plane based on the at least three three-dimensional positions. Determining the front face of the trailer based on the point cloud map may include determining clusters of points within the point cloud map. In some examples, the method includes for each cluster, determining a center of the cluster. The method may also include projecting the center of the cluster on the camera plane. The method may also include determining the cluster associated with the center having the shortest distance to a center of the camera. The method may also include determining the front face plane based on the points of the cluster of points having the shortest distance to the center of the camera. In some examples, the method further includes projecting the points of the cluster associated with the center having the shortest distance to the center of the camera on the camera plane. The method may also include determining a line associated with the projected points. The method may also include projecting the projected points on the line to determine a segment containing all the projected points. A line through a midpoint of the segment along the normal line is indicative of an alignment direction. Determining the point cloud map includes executing one of a visual odometry (VO) algorithm, a simultaneous localization and mapping (SLAM) algorithm, and a structure from motion (SfM) algorithm.

Another aspect of the disclosure provides a system for aligning a tow vehicle with a trailer positioned behind the tow vehicle. The system includes: data processing hardware; and memory hardware in communication with the data processing hardware. The memory hardware stores instructions that when executed on the data processing hardware cause the data processing hardware to perform operations that include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1A is a schematic top view of an exemplary tow vehicle at a distance from a trailer.

FIG. 3 is a perspective view of a trailer of FIGS. 1A and 1B.

Like reference symbols in the various drawings indicate like elements.

DETAILED DESCRIPTION

Figure 1B:
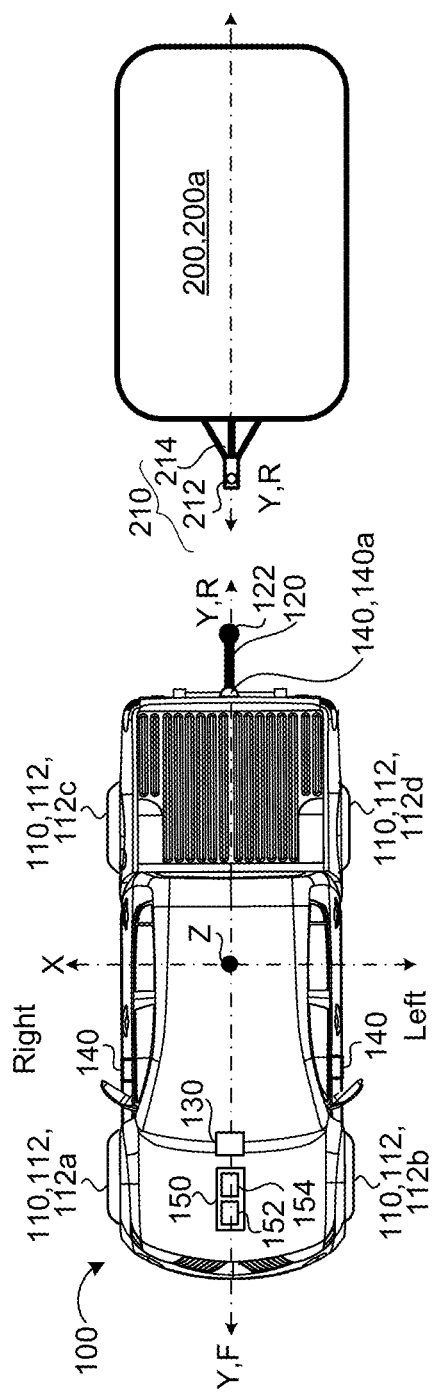
FIG. 1B is a schematic top view of an exemplary tow vehicle aligned with a trailer.
Figure 2:
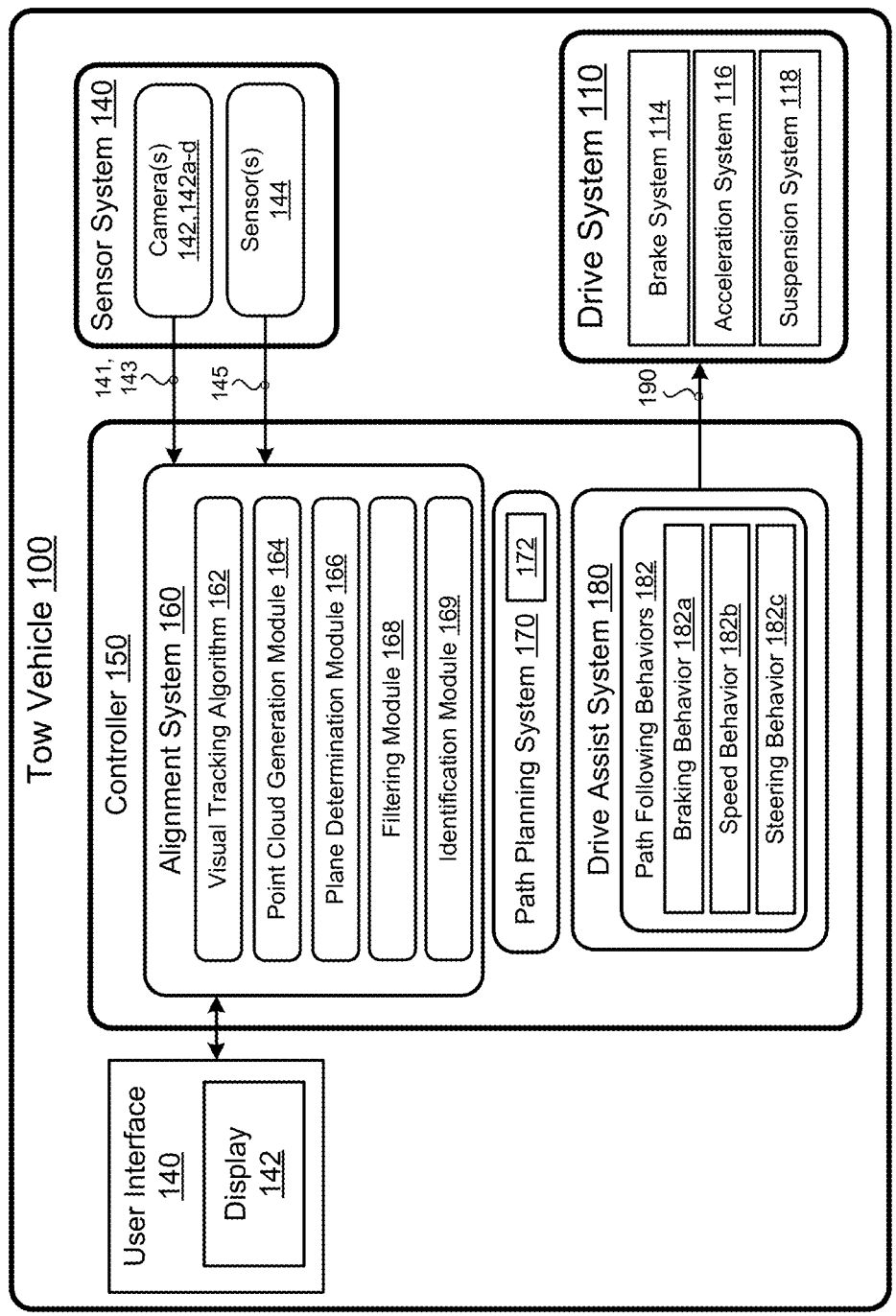
FIG. 2 is a schematic view of an exemplary tow vehicle having an alignment system.

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable of autonomously backing up towards a trailer identified from one or more representations of trailers displayed on a user interface, such as a user display. In addition, it is also desirable to have an alignment system that is capable of aligning the tow vehicle with the trailer during a hitching process. The alignment system is invariant to the initial pose of the tow vehicle or the trailer.

Referring to FIGS. 1-7, in some implementations, a driver of a tow vehicle 100 wants to tow a trailer 200 positioned behind the tow vehicle 100. The tow vehicle 100 may be configured to receive an indication of a driver selection 134 associated with a representation of a selected trailer 200, 200a-c. In some examples, the driver maneuvers the tow vehicle 100 towards the selected trailer 200, 200a-c, while in other examples, the tow vehicle 100 autonomously drives towards the selected trailer 200, 200a-c. The tow vehicle 100 may include a drive system 110 that maneuvers the tow vehicle 100 across a road surface 10 based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 114 that includes brakes associated with each wheel 112, 112a-d, and an acceleration system 116 that is configured to adjust a speed and direction of the tow vehicle 100. In addition, the drive system 110 may include a suspension system 118 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 118 may be configured to adjust a height of the tow vehicle 100 allowing a tow vehicle hitch 120 (e.g., a vehicle hitch ball 122) to align with a trailer hitch 210 (e.g., trailer hitch coupler 212), which allows for autonomous connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis X extends between a right side and a left side of the tow vehicle 100. A forward drive direction along the fore-aft axis Y is designated as F, also referred to as forward motion. In addition, an aft or rearward drive direction along the fore-aft direction Y is designated as R, also referred to as rearward motion. When the suspension system 118 adjusts the suspension of the tow vehicle 100, the tow vehicle 100 may tilt about the X axis and or Y axis, or move along the central vertical axis Z.

The tow vehicle 100 may include a user interface 130. The user interface 130 receives one or more user commands from the driver via one or more input mechanisms or a screen display 132 (for example, a touch screen display) and/or displays one or more notifications to the driver. The user interface 130 is in communication with a vehicle controller 150, which is in turn in communication with a sensor system 140. In some examples, the user interface 130 displays an image of an environment of the tow vehicle 100 leading to one or more commands being received by the user interface 130 (from the driver) that initiate execution of one or more behaviors. In some examples, the user display 132 displays one or more representations 136, 136a-c of trailers 200, 200a-c positioned behind the tow vehicle 100. In this case, the driver selects a representation 136, 136a-c of a trailer 200, 200a-c causing the controller 150 to execute the alignment system 160 associated with the trailer 200, 200a-c of the selected representation 136, 136a-c. In some examples, where the user display 132 displays one representation 136, 136a-c of a trailers 200, 200a-c positioned behind the tow vehicle 100, the controller 150 may execute the alignment system 160 associated with the one trailer 200, 200a-c of the one representation 136, 136a-c automatically or upon an indication from the driver to autonomously attach to the trailer 200, 200a-c. The vehicle controller 150 includes a computing device (or processor or data processing hardware) 152 (e.g., central processing unit having one or more computing processors) in communication with non-transitory memory 154 (e.g., a hard disk, flash memory, random-access memory, memory hardware) capable of storing instructions executable on the computing processor(s) 152.

The tow vehicle 100 may include a sensor system 140 to provide reliable and robust driving. The sensor system 140 may include different types of sensors that may be used separately or with one another to create a perception of the environment of the tow vehicle 100. The perception of the environment is used for to aid the driver in making intelligent decisions based on objects and obstacles detected by the sensor system 140 or during autonomous driving of the tow vehicle 100. The sensor system 140 may include the one or more cameras 142. In some implementations, the tow vehicle 100 includes a rear camera 142a that is mounted to provide images 143 with a view of a rear-driving path for the tow vehicle 100. The rear camera 142a may include a fisheye lens that includes an ultra wide-angle lens that produces strong visual distortion intended to create a wide panoramic or hemispherical image 143. Fisheye cameras capture images 143 having an extremely wide angle of view. Moreover, images 143 captured by the fisheye camera have a characteristic convex non-rectilinear appearance. Other types of cameras may also be used to capture images 143 of the rear-driving path of the tow vehicle 100.

The sensor system 140 may include other sensors such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensors, stereo cameras, etc. The sensors 144 output sensor data 145 to the controller 150, i.e., the alignment system 160.

The vehicle controller 150 executes an alignment system 160 that receives images 143 from the camera 142a and sensor data 145 from the sensors 144 and determines a normal direction N of a front face 220 of the trailer in three-dimensional 3D world coordinate, and a middle point 222 of the trailer front face 220. The middle point 222 of the trailer front face 220 is used by the alignment system 660 as a reference point during the alignment process of the tow vehicle 100 with the trailer 200. Therefore, the alignment system 160 causes the tow vehicle 100 and the trailer 200 to be aligned during the hitching process. The initial pose (i.e., location and orientation) of the tow vehicle 100 or the trailer 200 does not affect the execution of the alignment system 160.

Figure 4A:
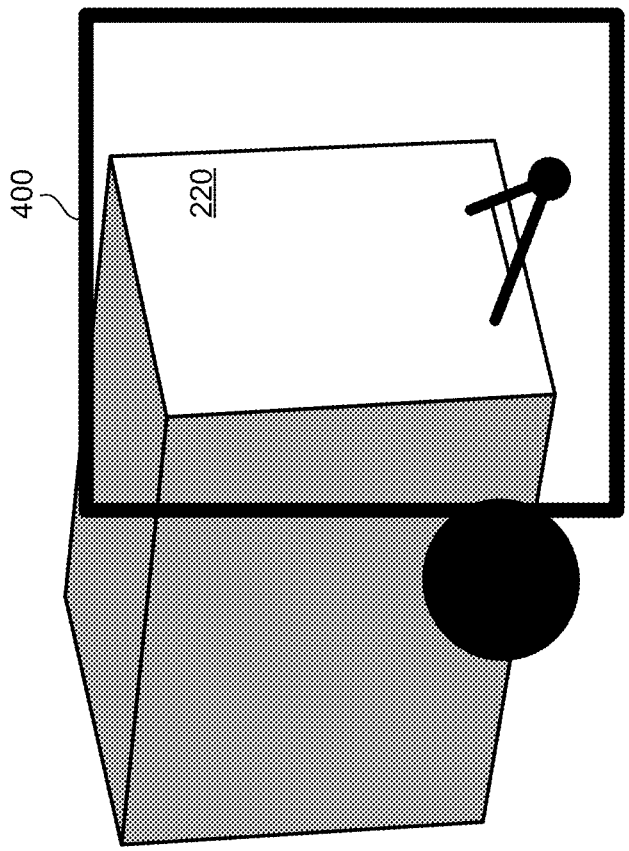
FIGS. 4A-4C are perspective views of different exemplary trailer images based on a position of a camera capturing the images.
Figure 4B:
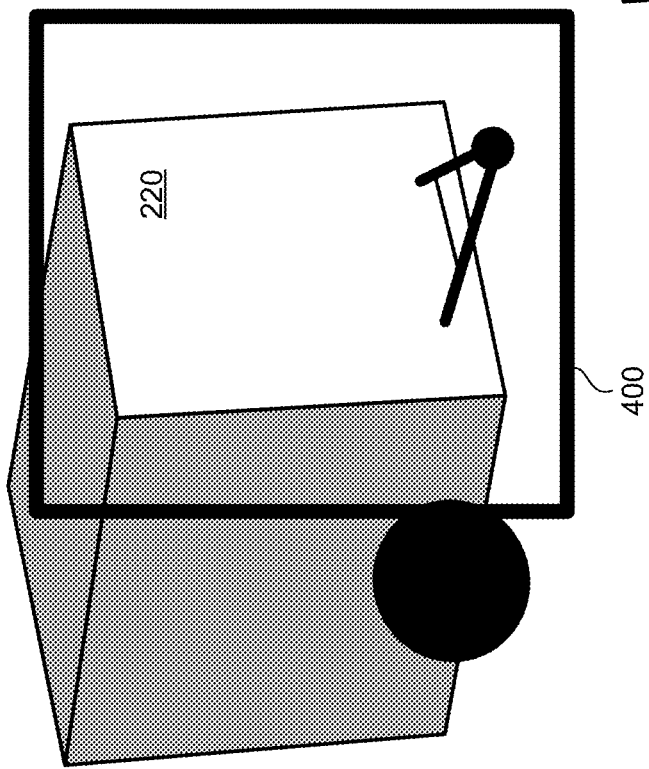
Figure 4C:
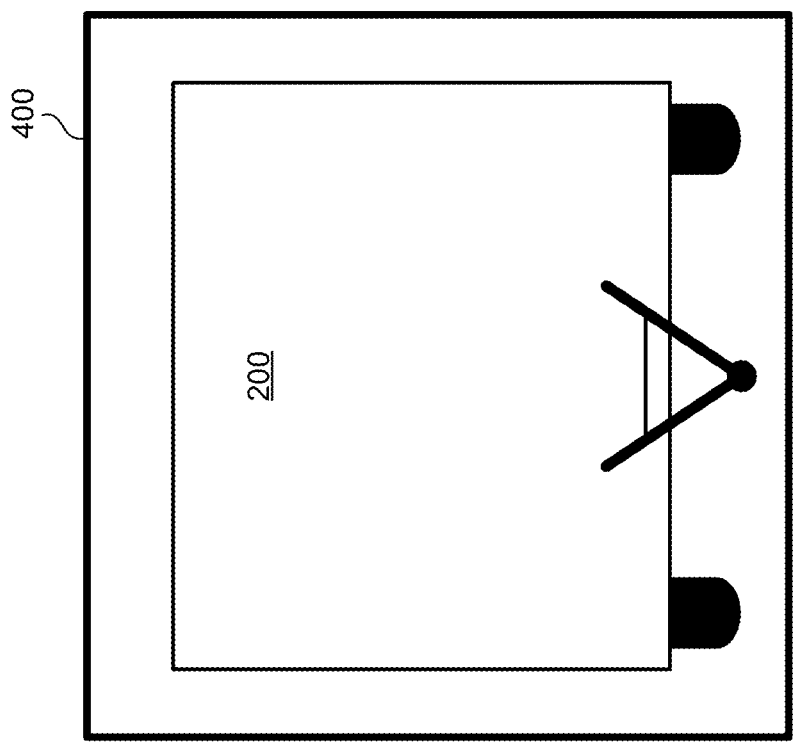

In some implementations, the alignment system 160 receives images 143 from the rear camera 142a. The alignment system 160 instructs the user interface 130 to display the received images 143 on the display 132 and solicit from the driver a selection of a region of interest (ROI) 400 within the displayed image 143 (FIGS. 4A-4C). The ROI 400 is a bounding box that includes the trailer 200. In other examples, the coupler location estimation and tracking system 160 may include a trailer identification algorithm that identifies the trailer within the image 143 and bounds the trailer 200 by the bounding box being the ROI 400.

As the tow vehicle 100 is moving in the rearward direction R or forward direction, the perspective and the size of the trailer 200 changes in the image 143. Therefore, a visual tracking algorithm 162 updates the ROI 400 based on the new images 143 that are received from the camera 142a during the forward F and rearward R drive movement along the fore-aft axis Y as shown in FIGS. 4A-4C. In some examples, the alignment system 160 extracts feature points within the ROI 400 and tracks the feature points. Examples of the feature points may include, but are not limited to, edges, corners or blobs on the trailer 200, the coupler 212, or the tow-bar 214.

Figure 5:
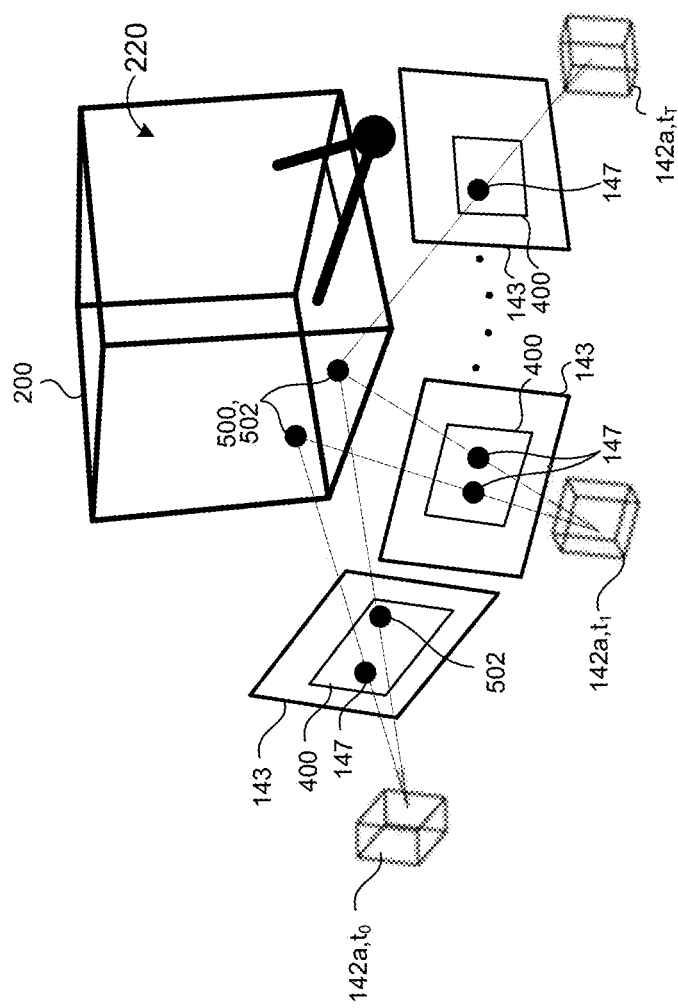
FIG. 5 is a schematic view of an exemplary camera capturing images of a trailer for generating a point cloud map.

The alignment system 160 includes a point cloud generation module 164 that generates a semi-dense/dense point cloud 500 of the objects within the ROI 400, for example, the trailer 200 (FIG. 5). A point cloud is a set of data points in 3D space, more specifically the point cloud includes a number of points 502 on the external surface of objects. Referring to FIG. 5, a pose (i.e., location and orientation) of the camera 142a changes with respect to the trailer 200. Therefore, as the camera pose changes while the tow vehicle 100 is moving, the camera 142a captures images 143 of the trailer 200 at different times to generate the point cloud map 500. For example, the camera 142a captures a first image 143 at time to. The first image 143 includes the ROI 400 which in turn includes the trailer 200 and feature points 502 (e.g., two-dimensional feature points) associated with the trailer 200. As the tow vehicle 100 moves, the camera pose changes. Thus at time ti, the camera captures a second image 143 that also includes the ROI 400 which in turn includes the trailer 200 and feature points 502 (e.g., two-dimensional feature points) associated with the trailer 200. As previously described, the visual tracking algorithm 162 tracks the feature points 502 in the ROI 400, therefore, the feature points 502 in the second image 143 change their perspective compared to the second image. The camera 142a continues to capture images 143 until the point cloud generation module 164 has enough feature points 502 to generate the point cloud 500.

The point cloud generation module 164 may use one or more techniques to localize generate the point cloud 500. Some of these techniques include, but are not limited to, Visual Odometry (VO), Simultaneous Localization and Mapping (SLAM), and Structure from Motion (SfM). The VO, SLAM and SfM frameworks are well established theories and allow the tow vehicle 100 to localize in a real-time in a self-generated 3D point cloud map. VO is a method of determining a position and orientation of the trailer 200, the camera 142a, the coupler 212, or the tow-bar 214 by analyzing the images 143 received from the camera 142a. The VO method may extract image feature points 502 and tracks them in the image sequence. Examples of the feature points 502 may include, but are not limited to, edges, corners or blobs on the trailer 200, the coupler 212, or the tow-bar 214. The VO method may also use pixel intensity in the image sequence directly as visual input. The SLAM method constructs or updates a map of an unknown environment while simultaneously keeping track of one or more targets. In other words, the SLAM method uses the received images 143 as the only source of external information, to establish the position and orientation of the tow vehicle 100 and the camera 142a, while at the same time, constructs a representation of the objects in the ROI 400. The SfM method estimates the 3D structure of the objects in the ROI 400 based on the received images 143 (i.e., 2D images). The SfM method may estimate a pose of the camera 142a and the tow vehicle 100 based on the sequence of images 143 that the camera 142 captures. Therefore, the point cloud generation module 164 generates a point cloud 500 and determines a camera pose based on executing one of the above techniques.

Figure 6A:
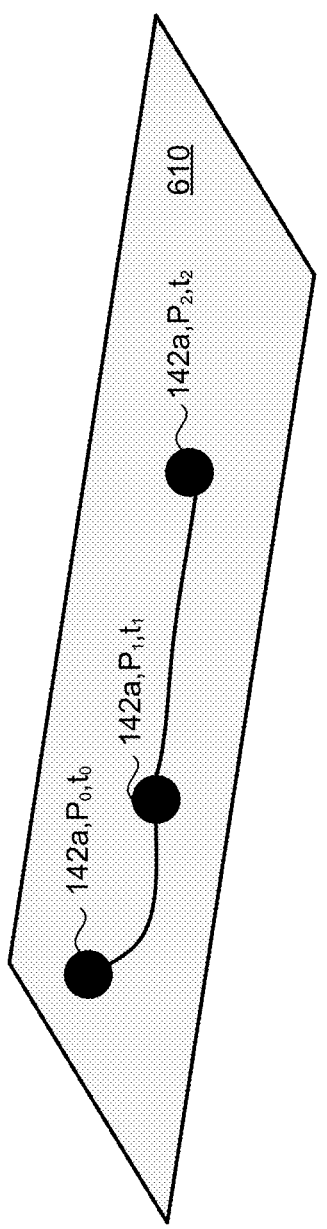
FIGS. 6A and 6B are schematic views of the camera plane and the road plane.
Figure 6B:
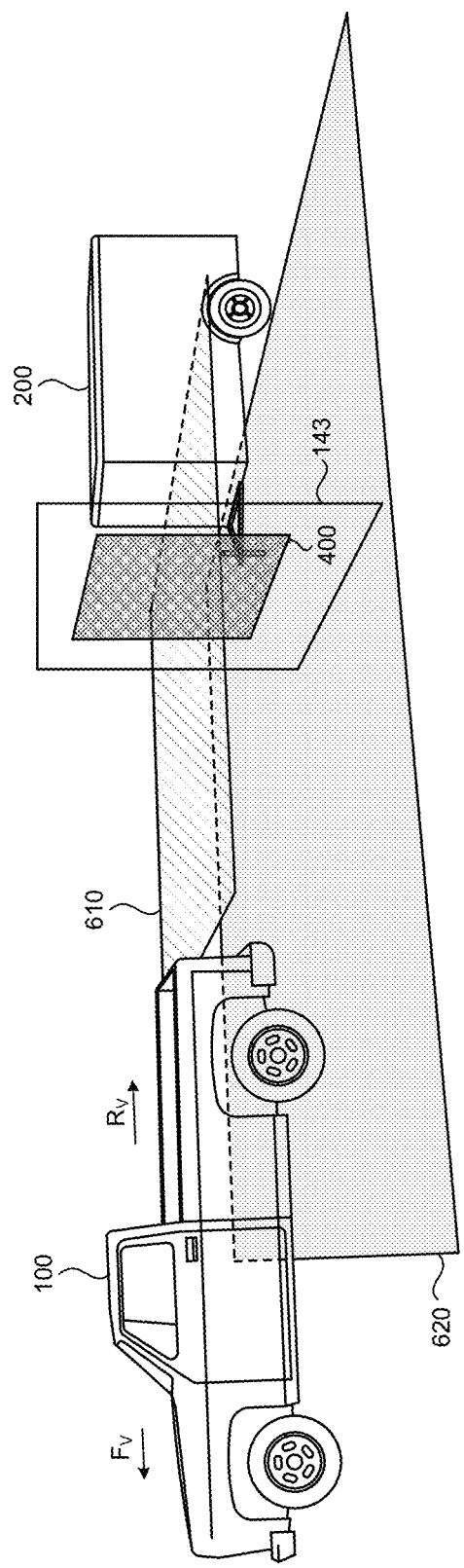
Figure 7:
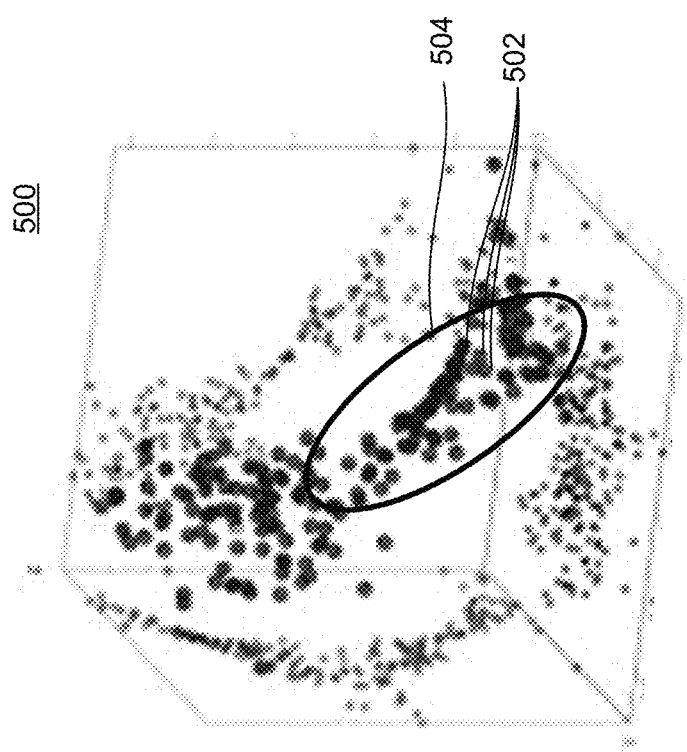
FIG. 7 is a schematic view of an exemplary point cloud map with the clustering algorithm.

The coupler location estimation and tracking system 160 includes a plane determination module 166 that is configured to determine a camera plane 610 and a road plane 620. Referring to FIGS. 6A and 6B, in some implementations, the plane determination module 166 determines a camera plane 610 along which the camera 142a moves and a road plane 620. To determine the camera plane 610, the plane determination module 166 uses at least three previous 3D positions $P_0$, $P_1$, $P_2$ of the camera 142a received from the camera 142a as camera data 141, as shown in FIG. 6A. The camera data 141 may include intrinsic parameters (e.g., focal length, image sensor format, and principal point) and extrinsic parameters (e.g., the coordinate system transformations from 3D world coordinates to 3D camera coordinates, in other words, the extrinsic parameters define the position of the camera center and the heading of the camera in world coordinates). In addition, the camera data 141 may include minimum/maximum/average height of the camera 142a with respect to ground (e.g., when the vehicle is loaded and unloaded), and a longitudinal distance between the camera 142a and the vehicle hitch ball 122. The plane determination module 166 determines the camera plane 610 based on the 3D positions $P_0$, $P_1$, $P_2$ of the three points of the at least three previous 3D positions $P_0$, $P_1$, $P_2$ of the camera 142a. In some examples, the coupler location estimation and tracking system 160 determines the road plane 620 based on the camera plane 610. In some implementations, based on the camera plane 610 and the camera data 141, the plane determination module 166 determines the road plane 620 since the road plane 620 is a shift of the camera plane 610 by the height of the camera 142a from the ground (which is provided in the camera information 141). This procedure is helpful when the three 3D points used to determine the camera plane 610 are collinear, in which case there exists infinite number of camera planes 610 that are coplanar to the line given by the 3D points $P_0$, $P_1$, $P_2$.

To determine the road plane 620, the plane determination module 166 extracts at least three feature points from the captured 2D image 143 associated with the road. Following, the coupler location estimation and tracking system 160 determines the 3D position of the three feature points within the point cloud 500 and then the coupler location estimation and tracking system 160 computes the road plane 620 based on the three feature points. In some examples, the coupler location estimation and tracking system 160 determines the camera plane 610 based on the road plane 620. In some implementations, based on the road plane 620 and the camera information 141, the coupler location estimation and tracking system 160 determines the camera plane since the camera plane 610 is a shift of the road plane 620 by the height of the camera 142a from the ground (which is provided by the camera information 141).

The plane determination module 166 may determine and update the planes 610, 620 in real time as the tow vehicle 100 is autonomously moving in the rearward R direction, or if the plane determination module 166 determines that the road is flat, then the coupler location estimation and tracking system 160 may determine the planes 610, 620 only once. The above methods use three points to determine the camera plane 610 or the road plane 620. However, in some examples, the plane determination module 166 may rely on more than three points to determine a plane 610, 620. In this case, the plane determination module 166 uses Least squares method, Radom Sample Consensus (RANSAC) method, Support Vector Machine (SVM) method, or any variation of these algorithms to determine the plane 610, 620. By using more than three points to determine the plane 610, 620, the plane determination module 166 increases the robustness to outliers.

The alignment system 160 includes a filtering module 168 for filtering the point cloud 500. The filtering module 168 compute a clustering algorithm with L clusters (where L is an integer). The clustering algorithm groups data points (e.g., cloud points 502) into clusters. For example, the clustering algorithm classifies the cloud points 502 generated by the generation module 166 into groups, where each point belongs to the cluster with the nearest mean. The clustering algorithm identifies the center or mean of each cluster and the points 502 belonging to each cluster. If a distance between any two centers of clusters is less than D (D may be chosen as the width of the front face of the trailer or any approximation to it), then the filtering module 268 executes the clustering algorithm with L−1 clusters. The filtering module 168 stop executing the clustering algorithm when all the distances between any two centers of the clusters is greater than D or when there is only 1 cluster in the point cloud 500.

The alignment system 160 includes an identification module 169 which identifies the front face 220 of the trailer 200, since the front face 220 of the trailer 200 is the closest trailer face to the vehicle 100 and supports the trailer hitch 210 for hitching. The identification module 169 determines a projection of each center of the clusters (determined by the filtering module 168) on the camera plane 610 or the road plane 620. The identification module 169 determines the projected point that is closer to a center of the camera 142a. If the centers of the clusters are projected on the camera plane 610, then the identification module 169 determines a distance from each projected center to the center of the camera 142a. However, if the centers of the clusters are projected on the road plane 620, then the identification module 169 determines a distance from each projected center to a projection of the center of the camera 142a on the road plane 620.

Once the identification module 169 determines the center of the cluster 504 that is closest to the camera 142a (i.e., the camera center), then the identification module 169 computes a plane P associated with the cluster cloud points 502 of the center that has the closest distance to the camera 142a. The identification module 169 may use one of the following algorithms RANSAC, Least Squares, SVM, or any variations thereof, to determine the plane P based on the cloud points 502 associated with the cluster 504 having a center closest to the camera 142a.

Following, the identification module 169 determines a width of the trailer 200. The identification module 169 projects the cloud points 502 associated with the cluster 504 having a center closest to the camera 142a onto the camera plane 610 (or the road plane 620), these projected points are denoted by set M. Then, the identification module 169 computes a line in the camera plane 610 or the road plane 620 that fits the projected points of the set M. The identification module 169 executed one of RANSAC, Least Squares, SVM, or any variations thereof to determine the line that fits the projected points of the set M. Next, the identification module 169 projects the points in the set M onto the line to find a segment of the line that includes all the projected points. This segment is indicative of an estimated trailer width.

In some examples, the identification module 169 determines the line based on the intersection between the face plane P and the camera plane 610 (or road plane 620). Then the identification module 169 projects the points of set M onto the line to find the segment of the line that includes all the projected points. This segment is indicative of the estimated trailer width.

The identification module 169 determines the middle point 222 of the segment, which is the reference point 222 for alignment. The identification module 169 determines a normal line N of the plane P which provides the direction to align the vehicle 100.

Referring back to FIG. 2, the vehicle controller 150 executes a path planning system 170 that plans a path 172 based on the normal direction N of the front face 220 if the trailer 200 in 3D world coordinate and the reference point 222. The path planning system 170 may include maneuvering the tow vehicle 100 in a rearward direction.

As the vehicle 100 is autonomously maneuvering along the planned path, the path planning system 170 continuously updates the path based on continuously receiving sensor data. In some examples, an object detection system identifies one or more objects along the planned path 172 and sends the path planning system 170 data relating to the position of the one or more objects. In this case, the path planning system 170 recalculates the planned path 172 to avoid the one or more objects while also executing the predetermined maneuvers. In some examples, the path planning system determines a probability of collision and if the probability of collision exceeds a predetermined threshold, the path planning system 170 adjusts the path and sends it to the drive assist system 180.

The drive assist system 180 includes path following behaviors 182. The path following behaviors 182 receive the planned path 172 and execute one or more behaviors 182 that send commands 190 to the drive system 110, causing the vehicle 100 to autonomously drive along the planned path, which causes the vehicle 100 to align for hitching as shown in FIG. 1B.

The path following behaviors 182, 182a-b may include one or more behaviors, such as, but not limited to, a braking behavior 182a, a speed behavior 182b, and a steering behavior 182c. Each behavior 182, 182a-b causes the vehicle 100 to take an action, such as driving backward, turning at a specific angle, breaking, speeding, slowing down, among others. The vehicle controller 150 may maneuver the vehicle 100 in any direction across the road surface by controlling the drive system 110, more specifically by issuing commands 190 to the drive system 110.

The braking behavior 182a may be executed to either stop the vehicle 100 or to slow down the vehicle 100 based on the planned path. The braking behavior 182a sends a signal or command 190 to the drive system 110, e.g., the brake system (not shown), to either stop the vehicle 100 or reduce the speed of the vehicle 100.

The speed behavior 182b may be executed to change the speed of the vehicle 100 by either accelerating or decelerating based on the planned path. The speed behavior 182b sends a signal or command 190 to the brake system 114 for decelerating or the acceleration system 116 for accelerating.

The steering behavior 182c may be executed to change the direction of the vehicle 100 based on the planned path. As such, the steering behavior 182c sends the acceleration system 130 a signal or command 190 indicative of an angle of steering causing the drive system 110 to change direction.

The alignment system 160, as described above, determines a face plane P for a trailer 200 having a flat front. However, the alignment system 160 may also be used with trailer 200 that do not have a flat front 220. In this case, the alignment system 160 solicits an input from the driver to enter a shape of the trailer front 220, for example, from a set of pre-determined shapes. Or in other examples, the alignment system 160 includes a shape determination module that determines the shape of the front of the trailer. As such, the identification module 169 adjusts its calculations based on the shape of the trailer front 220.

The alignment system 160 is designed to work in real time in a standard CPU with or without the use of GPU, graphic accelerators, training, or FPGAs.

Figure 8:
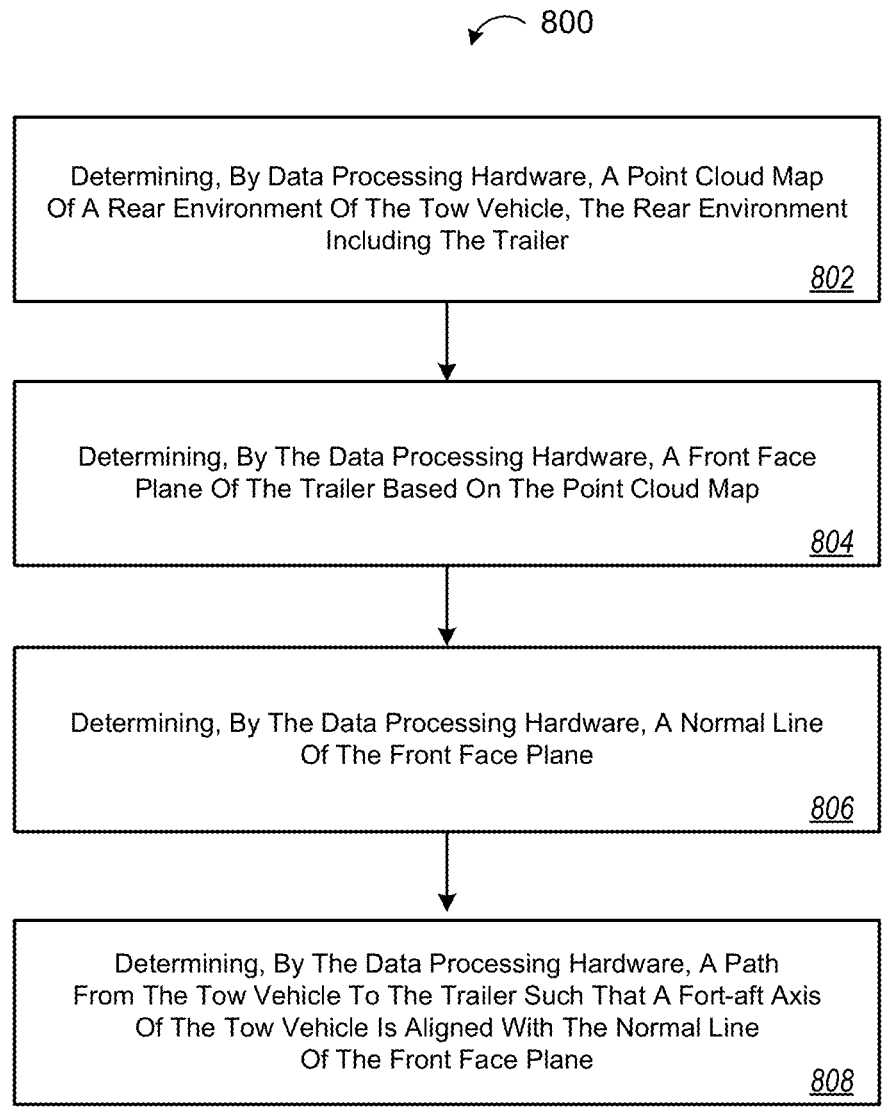
FIG. 8 is a schematic view of an exemplary arrangement of operations for aligning a tow vehicle with a trailer positioned behind the tow vehicle.

FIG. 8 provides an example arrangement of operations of a method 800 for of aligning a tow vehicle 100 with a trailer 200 positioned behind the tow vehicle 100 using the system described in FIGS. 1-7. At block 802, the method 800 includes determining, by data processing hardware 152, a point cloud map 500 of a rear environment of the tow vehicle. The rear environment includes the trailer 200, i.e., a representation 136 of the trailer 200. At block 804, the method 800 includes determining, by the data processing hardware 152, a front face plane P of the trailer 200 based on the point cloud map 500. At block 806, the method 800 includes determining, by the data processing hardware 152, a normal line N of the front face plane P (FIG. 2) At block 808, the method 800 includes determining, by the data processing hardware 152, a path 172 from the tow vehicle 100 to the trailer 200 such that a fore-aft axis Y of the tow vehicle 100 is aligned with the normal line N of the front face plane P.

In some implementations, the method includes receiving one or more images 143 from a camera 142a positioned on a back portion of the tow vehicle 100 and in communication with the data processing hardware 152. The method 800 may also include identifying a ROI 400 that includes a trailer representation 136 within the one or more images 143. The trailer representation 136 indicative of the trailer 200 positioned behind the tow vehicle 100. As such, determining the point cloud map 500 of the rear environment of the tow vehicle 100 includes determining the point cloud map 500 associated with the ROI 400 only.

In some examples, the method 800 includes determining at least three three-dimensional positions of the rear camera 142a from the received images 143, while the tow vehicle 100 is moving. The method may also include determining a camera plane 610 based on the at least three three-dimensional positions.

Determining the front face of the trailer based on the point cloud map may include: determining clusters 504 of points 502 within the point cloud map 500; and for each cluster 504, determining a center of the cluster 504. The method 800 may also include projecting the center of the cluster 504 on the camera plane 610. In some examples, the method 800 includes: determining the cluster 504 associated with the center having the shortest distance to a center of the camera 142a; and determining the front face plane P based on the points 502 of the cluster 504 having the shortest distance to the center of the camera 142a.

In some examples, the method 600 includes projecting the points 502 of the cluster 504 associated with the center having the shortest distance to the center of the camera 142a on the camera plane 610 and determining a line associated with the projected points. The method 600 may include projecting the projected points on the line to determine a segment including all the projected points. A line through a midpoint 222 of the segment along the normal line is indicative of an alignment direction.

Determining the point cloud map 500 may include executing one of a Visual Odometry (VO) algorithm, a Simultaneous Localization and Mapping (SLAM) algorithm, and a Structure from Motion (SfM) algorithm.

In some examples, the method 800 includes sending instructions 190 to a drive system 110 in communication with the data processing hardware 152. The instructions 190 causing the tow vehicle 100 to autonomously drive along the path 710 in a rearward direction R.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of aligning a tow vehicle with a trailer positioned behind the tow vehicle, the method comprising:
   determining, by data processing hardware, a point cloud map of a rear environment of the tow vehicle, the rear environment including the trailer;
   determining, by the data processing hardware, a front face plane of the trailer based on the point cloud map;
   determining, by the data processing hardware, a normal line of the front face plane; and
   determining, by the data processing hardware, a path from the tow vehicle to the trailer such that a fore-aft axis of the tow vehicle is aligned with the normal line of the front face plane.

2. The method of claim 1, further comprising:
   receiving one or more images from a camera positioned on a back portion of the tow vehicle and in communication with the data processing hardware; and
   identifying a region of interest (ROI) that includes a trailer representation within the one or more images, the trailer representation indicative of the trailer positioned behind the tow vehicle;
   wherein determining the point cloud map of the rear environment of the tow vehicle includes determining the point cloud map associated with the ROI only.

3. The method of claim 1, further comprising:
   receiving images from a camera positioned on a back portion of the tow vehicle and in communication with the data processing hardware;
   determining at least three three-dimensional positions of the rear camera from the received images, while the tow vehicle is moving; and
   determining a camera plane based on the at least three three-dimensional positions.

4. The method of claim 3, wherein determining the front face of the trailer based on the point cloud map includes:
   determining clusters of points within the point cloud map;
   for each cluster, determining a center of the cluster;
   projecting the center of the cluster on the camera plane;
   determining the cluster associated with the center having the shortest distance to a center of the camera; and
   determining the front face plane based on the points of the cluster of points having the shortest distance to the center of the camera.

5. The method of claim 4, further comprising:
   projecting the points of the cluster associated with the center having the shortest distance to the center of the camera on the camera plane;
   determining a line associated with the projected points; and
   projecting the projected points on the line to determine a segment containing all the projected points, a line through a midpoint of the segment along the normal line is indicative of an alignment direction.

6. The method of claim 1, wherein determining the point cloud map comprises executing one of a Visual Odometry (VO) algorithm, a Simultaneous Localization and Mapping (SLAM) algorithm, and a Structure from Motion (SfM) algorithm.

7. The method of claim 1, further comprising:
   sending instructions to a drive system in communication with the data processing hardware, the instructions causing the tow vehicle to autonomously drive along the path in a rearward direction.

8. A system for aligning a tow vehicle with a trailer positioned behind the tow vehicle, the system comprising:
   data processing hardware; and
   memory hardware in communication with the data processing hardware, the memory hardware storing instructions that when executed on the data processing hardware cause the data processing hardware to perform operations comprising:
      determining a point cloud map of a rear environment of the tow vehicle, the rear environment including the trailer;
      determining a front face plane of the trailer based on the point cloud map;
      determining a normal line of the front face plane; and
      determining a path from the tow vehicle to the trailer such that a fore-aft axis of the tow vehicle is aligned with the normal line of the front face plane.

9. The system of claim 8, wherein the operations further include:
   receiving one or more images from a camera positioned on a back portion of the tow vehicle and in communication with the data processing hardware; and
   identifying a region of interest (ROI) that includes a trailer representation within the one or more images, the trailer representation indicative of the trailer positioned behind the tow vehicle;
   wherein determining the point cloud map of the rear environment of the tow vehicle includes determining the point cloud map associated with the ROI only.

10. The system of claim 8, wherein the operations further include:
receiving images from a camera positioned on a back portion of the tow vehicle and in communication with the data processing hardware;
determining at least three three-dimensional positions of the rear camera from the received images, while the tow vehicle is moving; and
determining a camera plane based on the at least three three-dimensional positions.

11. The system of claim 10, wherein determining the front face of the trailer based on the point cloud map includes:
determining clusters of points within the point cloud map;
for each cluster, determining a center of the cluster;
projecting the center of the cluster on the camera plane;
determining the cluster associated with the center having the shortest distance to a center of the camera; and
determining the front face plane based on the points of the cluster of points having the shortest distance to the center of the camera.

12. The system of claim 11, wherein the operations further include:
projecting the points of the cluster associated with the center having the shortest distance to the center of the camera on the camera plane;
determining a line associated with the projected points; and
projecting the projected points on the line to determine a segment containing all the projected points, a line through a midpoint of the segment along the normal line is indicative of an alignment direction.

13. The system of claim 8, wherein determining the point cloud map comprises executing one of a Visual Odometry (VO) algorithm, a Simultaneous Localization and Mapping (SLAM) algorithm, and a Structure from Motion (SfM) algorithm.

14. The system of claim 8, wherein the operations further include:
sending instructions to a drive system in communication with the data processing hardware, the instructions causing the tow vehicle to autonomously drive along the path in a rearward direction.

* * * * *